Figure 6:
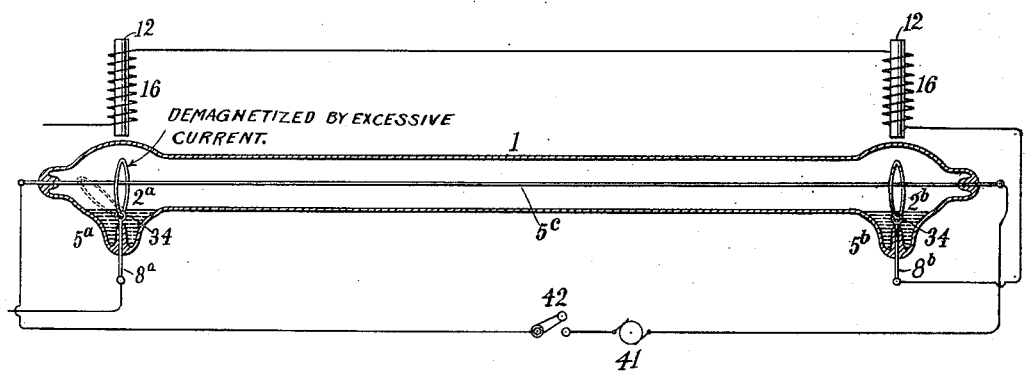

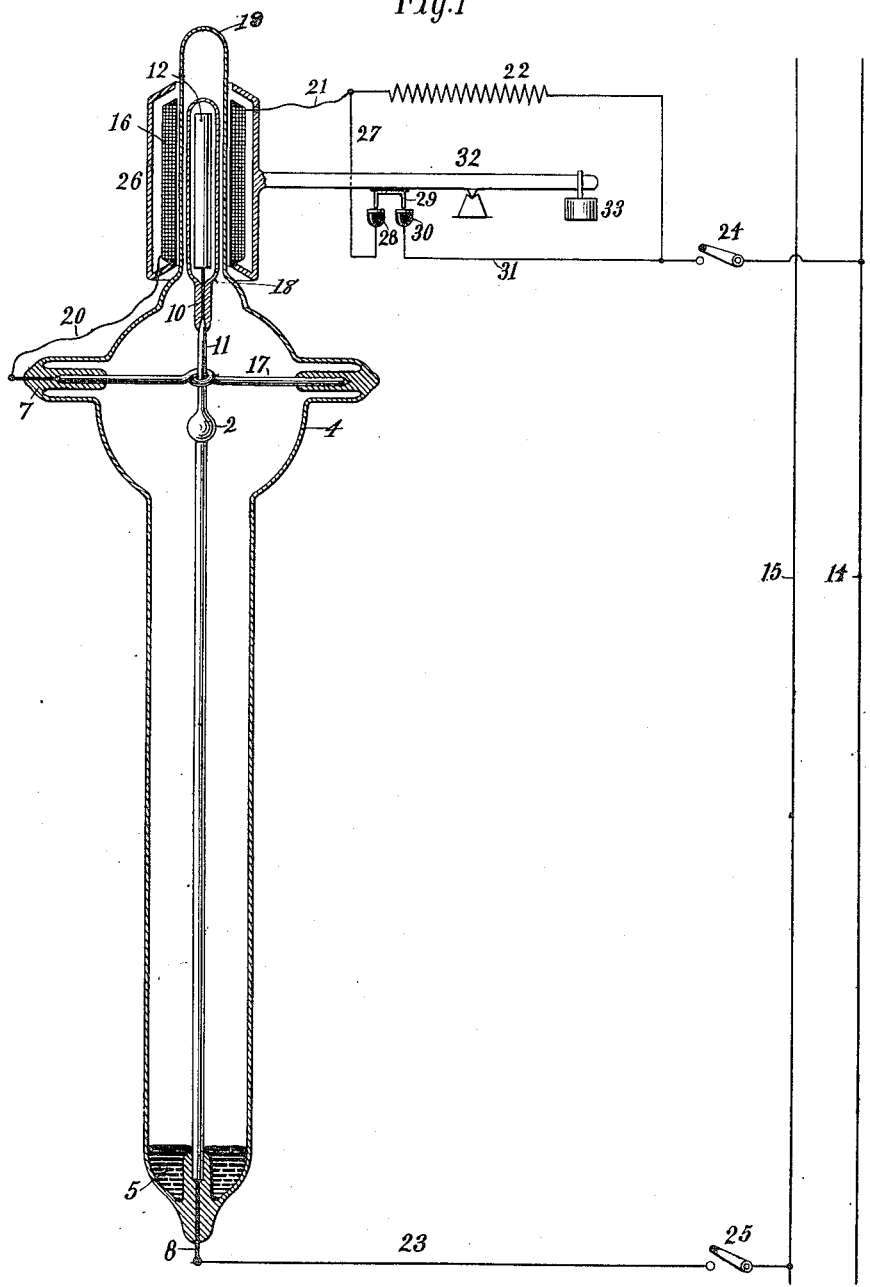

P. C. HEWITT.
ELECTRIC LIGHTING APPARATUS.
APPLICATION FILED MAR. 23, 1901.

1,064,685.

Patented June 10, 1913.

2 SHEETS—SHEET 2.

Witnesses:
Raphael Netter
Wm H Capel.

Inventor
Peter Cooper Hewitt
by Charles A Perry Att'y

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRIC-LIGHTING APPARATUS.

1,064,685.      Specification of Letters Patent.      Patented June 10, 1913.

Application filed March 23, 1901. Serial No. 52,488.

*To all whom it may concern:*

Be it known that I, PETER COOPER HEWITT, a citizen of the United States, and a resident of New York, in the county of New York and State of New York, have invented certain new and useful Improvements in Electric-Lighting Apparatus, of which the following is a specification.

My invention relates to that class of electric apparatus in which the conducting medium is a vapor or gas.

The apparatus may be used as a lamp or source of light or for various other purposes.

In certain patents issued to me on the 17th day of September, 1901, for example, United States Patents #682,690 and 682,695, I have described various forms of vapor or gas electric apparatus, and the present invention relates more particularly to means for conveniently starting and operating lamps or other gas or vapor electric apparatus in which the phenomena at the negative electrode constitute an important part of the resistance to starting.

I have found that in an apparatus having a vapor or gas path intervening between the negative and positive electrodes, under certain conditions of purity, there is an apparent reluctance on the part of the current to enter the negative electrode. I have further found that the tendency of the current is to assume a path between the positive electrode and that portion of the negative electrode which is remote therefrom. For instance, in a tube of considerable length constituting the inclosing chamber of the apparatus, if a conducting rod constituting an extension of the negative electrode be extended through a considerable portion of the length of the tube, the current will enter the negative electrode at a point, generally speaking, as remote as possible from the positive electrode, instead of traversing the extended conductor. The exact explanation of this phenomenon is not essential to a description of my invention. From experiments which I have made, however, I believe that it is proven beyond reasonable doubt that the current tends to remain in the vapor path as long as possible before entering the negative electrode.

For the purpose of starting the appartus, I sometimes employ some special means for overcoming the initial reluctance of the current to traverse the space immediately surrounding the negative electrode. I have found, however, that by making an actual electrical contact between the positive and negative electrodes and then separating the two while current is flowing, it will continue to flow under the influence of a moderate difference of potential, the negative resistance phenomenon to starting having thus been eliminated.

I avail myself of the phenomenon of the reluctance of the current to enter the negative electrode by extending the negative electrode of the lamp to a point near the positive electrode and providing means for first bringing the two electrodes into electrical contact and then causing a break or open space to be made between the two whereupon the current which is first established at the junction is caused by the phenomenon to pass through the vapor and immediately traverse the apparatus, entering the negative electrode remote from the positive electrode. Many different means may be employed for securing the initial contact between the electrodes and obtaining the break in the continuity thereof.

For purposes of illustration, I may select an apparatus containing mercury as the negative electrode, and I may cause a rod of some conducting material to pass from the negative electrode into and through a considerable length of vapor, that is to say, through practically the entire operating vapor path. In electrical contact with the remote end of this rod, I may bring the positive electrode (which may be of iron or other suitable material), and I may arrange the parts so that one or the other of the two electrodes shall be movable, whereby it shall be made possible to bring the electrodes into contact or separate them at will, or I may use a bridging piece for the same purpose. In order to render the operation of the movable electrode automatic, it may be of iron or I may connect with it a piece of magnetic material, such as iron, and I may cause this iron piece to be acted upon by a magnet or solenoid outside the inclosing vessel of the device or by rotating the device may cause gravity to act. By including the two electrodes in the circuit of the magnet or solenoid, when the electrodes are in contact, I may cause the initial current passing through the contacting electrodes to separate the contacts and to bring about the condition in which the current selects the vapor path instead of the path through the solid extension of the negative electrode. Other means of separating the electrodes may be employed.

It is desirable to have a resistance in series with the apparatus when the electrodes are in contact, but this resistance may be cut out by the passing current and, if desired, by the same device which automatically separates the electrodes as soon as current begins to pass.

In order to protect the apparatus from the effects of gases or vapors which are liable to be given off from the armature after the manufacture of the apparatus, the armature may be inclosed in a glass or other receptacle which is gas-tight. This receptacle may be somewhat larger than the armature, or it may be sealed tightly around it. Where magnetic material of considerable size is used for operating the electrode, a small wire may be employed to connect the armature with the electrode directly through the wall of its container, or when at a distance from the electrode the wire may be sealed in glass throughout its length. By these means, a rupture of the glass inclosing the armature would not render the device inoperative.

Figure 3:
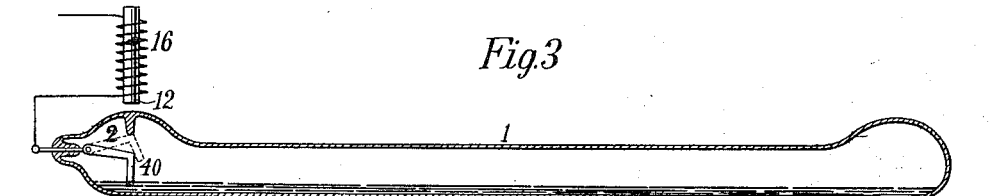
Figure 2:
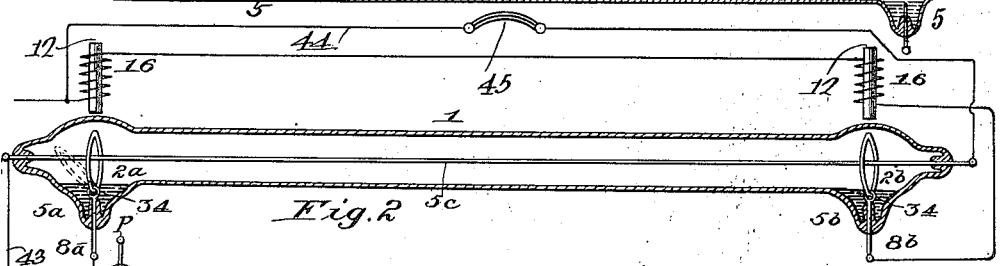
Figure 4:
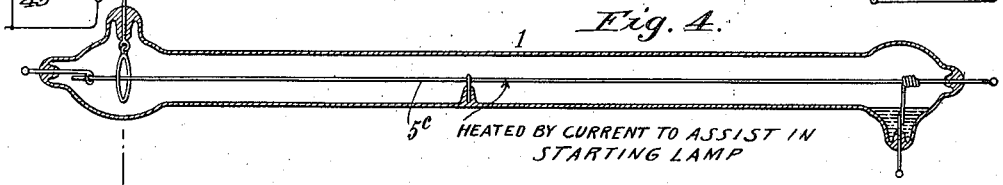
Figure 5:
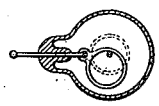

In the accompanying drawings, Figure 1 shows one form of device suited for the purposes of the invention; Figs. 2, 3 and 4, illustrate modifications; Fig. 5 is a section along the line P—P in Fig. 4; and Fig. 6 shows still another modification.

Referring to the drawing, 1 represents the inclosing tube or chamber of a gas or vapor apparatus. In this instance the negative electrode, 5, extends from one end of the apparatus through the greater portion of the length thereof, the end remote from the positive electrode being surrounded in this instance by a small quantity of mercury, in case the vapor path of the apparatus consists essentially of mercury vapor. The mercury assists also in protecting the portions of the glass surrounding the leading-in conductor, 8, which extends through the wall of the chamber. The mercury, moreover, is, during the operation of the apparatus, volatilized to a greater or less extent and condensed within the chamber and particularly within the enlargement 4 surrounding the positive electrode 2. This serves to dissipate the heat by reason of its volatilization.

The negative electrode, 5, may be of soft iron, aluminum or other suitable non-gaseous conductor which may be tubular. By the term "solid" in the specification and claims, I refer to material in a state distinguished from a gas or vapor, not necessarily excluding solid material in a tubular form or a liquid. The positive electrode 2 is carried by the core, 12, usually being connected therewith by a wire, 10, extending through the support 11. The core 12 is contained within an inclosing case, 18, which serves to prevent the giving off of vapors after the apparatus has been finished. The wire 10, serves to securely hold the electrode 2 even if the glass or other material employed as the inclosing case for the core were to become cracked or broken. The core 12 is inclosed in an extension, 19, of the tubular portion of the container and this extension is surrounded by a magnetizing coil, 16, which serves, when traversed by a suitable electric current to raise the core and thus separate the electrode 2, from the electrode 5. The upper end of the electrode 2 passes through a suitable guide, 17, so constructed as to make electrical contact therewith, and electrical connections are made therewith through the conductor, 20, connected with one terminal of the coil 16, and a suitable leading-in conductor 7 passing through the wall of the inclosing case of the apparatus. The remaining terminal of the coil 16 is connected by a conductor, 21, with the positive conductor 14 of the main circuit. A suitable resistance, 22, may be included in the conductor 21. A conductor, 23, connects the leading-in wire 8, and thus the negative electrode, with the negative wire 15 of the main circuit.

The operation of the apparatus is as follows: When the parts are at rest and the circuit is closed with the main line by the switches 24 and 25, the current will pass from the main conductor 14, through the resistance 22 and conductor 21, including the solenoid 16, the conductor 20, the leading-in wire 7 and the positive electrode 2. This latter being at this time in actual contact with the negative electrode 5, the current will traverse the latter and passing through the leading-in wire 8 will return to the main wire 15 by way of the conductor, 23. This current traversing the coil 16, will draw the core 12 within itself, thus raising the electrode 2 out of contact with the electrode 5, whereupon the current will pass from one electrode to the other through the intervening gas or vapor, but instead of continuing to flow to the adjacent portion of the negative electrode, it will immediately proceed to the remote end of the negative electrode 5 through the intervening vapor with the attendant luminosity. For the purpose of cutting the resistance 22 out of circuit when the apparatus has been thus started, a supplemental armature, 26, may be provided for the coil 16, which may be constructed to have a time element by weighting the armature or in any other convenient manner. This armature 26 is employed for cutting out the resistance 22 and, in this case, closing a short-circuit around it. For this purpose a conductor, 27, leads from the conductor 21 to a contact-point, 28, of a circuit-closing arm or bar, 29, the remaining contact-point, 30, of which is connected by a conductor, 31, with the conductor 22. The bar 29 is carried by the supporting-arm of the armature 26 which is pivoted at 32, and when the armature is actuated by the current flowing through the coil 16, the circuit between the points 28 and 30 will be closed. In the drawing, I have shown the armature 26 as being overbalanced by a counterweight, 33, but it will be understood that a spring or any other convenient means for balancing the armature may be employed.

In Fig. 2, I have illustrated a form of apparatus in which the extension of the negative electrode is completely cut out of circuit when the apparatus is in operation. In this instance, the conductor $5^c$ extends through the entire length of the apparatus and may be regarded as part or an extension of the electrode. It is shown as being surrounded near its respective ends by two rings $2^a$ and $2^b$ which when the apparatus is not in operation lie against the rod $5^c$ being pivoted at 34 and connected by leading-in wires $8^a$ and $8^b$. A small quantity of mercury may surround the base of each of these electrodes as before. The operation of this apparatus is as follows: When the circuit is closed therewith, current will pass through the respective rings $2^a$ and $2^b$, as well as the intermediate portion of the rod $5^c$, and, the connections being such as to cause the currents to traverse the coils 16, surrounding the cores 12, the contact rings $2^a$ and $2^b$ acting as armatures will be lifted from the wire, thus cutting the rod $5^c$ out of circuit. The current will then traverse the gas path between the two electrodes, either of the rings $2^a$ or $2^b$, acting as positive, and the electrode $5^b$ or $5^a$ acting as the corresponding negative electrode, depending on which way the current is flowing through the apparatus. It will of course be understood that the rings $2^a$ and $2^b$ are either themselves magnetic or carry magetic armatures. If desired one of the magnets may be made to act more slowly than the other so that the separation will take place at the corresponding electrode subsequent to the separation at the other electrode. The rings $2^a$ and $2^b$ may be made of such size that the one acting as a positive electrode will become heated to a red heat by the flow of an excess of current, and thereupon it will cease to be held up by the corresponding magnet, and will therefore fall back to its position of contact thus substantially cutting the apparatus out and preventing it from being injured; returning, however, to its position of no contact when cooled.

In Fig. 3, a modification is shown in which the extension of the negative electrode is in a liquid state. The tube 1 is here shown in a horizontal position and the extension of the electrode 5 consists of a quantity of mercury extending from the negative leading-in wire to a point near the positive terminal. Any convenient means may be employed for breaking contact at the positive electrode, for instance a contact, 40, carried by or connected with the electrode 2 may be raised from the mercury by the action of the solenoid or magnet 16, as before. Instead of causing the separation of the electrodes by electro-magnetic means, it is possible to use other instrumentalities as, for instance, an arrangement such as shown in Fig. 4, which resembles the structure shown in Fig. 2, but is so organized that by giving a slight rotation to the tube the positive electrode $2^a$ will be carried by gravity out of contact with the extension $5^c$ of the negative electrode.

In some cases it is desirable to heat the vapor within the apparatus, and I have found that the extension of the negative electrode may be employed for that purpose by the initial current passing therethrough, or current from another source may be caused to traverse this extension raising its temperature to the required degree and thus raising the temperature of the apparatus. This heating effect may be discontinued when the vapor has acquired the desired temperature. When the apparatus is in operation the heating current may be discontinued. A wire may be run through any of the devices to serve as a heater without interfering with the apparatus. This initial heating action may be more fully explained as follows: Considering first the connection in which the separate source is used for heating the container as illustrated in Fig. 6, it is evident that upon the closure of the switch 42, current will flow from the generator 41, through the device. The conductor $5^c$, which must be proportioned suitably to take the proper amount of current from the generator 41, to heat the device, will then dissipate the energy of the current and produce the desired physical condition in the apparatus. The arrangement shown is economical and advantageous, since in the absence of series resistance or other auxiliary devices in the leads of the generator 41, all the energy there supplied, goes toward heating the conductor. It is evident that other arrangements might be used without departing from the present invention. When the object of the preliminary heating has been secured, the supply of energy from the generator 41, may be discontinued by the opening of the switch 42. Considering now the connection in which the heating current is received from the same source as the normal energy supply, shown in Fig. 2, a similar result is produced. Upon the application of potential to the mains of the device, a double flow of current takes place; first, through the heating circuit by way of the conductors 43 and 44 and the circuit breaker 45. Here, as before, the conductor 5ᶜ, which must be suitably proportioned to the voltage of the supply receives current and generates heat, which will produce the desired effect. Here, as in Fig. 6, the proportioning of the conductor to receive current directly from the supply without waste in external controlling devices, adds to the efficiency and economy of the system. It is evident, however, that other arrangements might be used without departing from the present invention. Upon the application of potential current will also flow from the supply through a second circuit containing the magnets 16 and the electrodes 5ᵃ and 5ᵇ, and the rings 2ᵃ and 2ᵇ, and the conductor 5ᶜ. This current will operate the magnets 16 and their corresponding armatures 2ᵃ and 2ᵇ, which will start the device when the proper condition is produced by the initial heating current as already described. The arrangement shown provides for the continuous flow of heating current in the initial stages before the normal operation of the apparatus independently of the making and breaking of contact by the rings 2ᵃ and 2ᵇ. It is, however, to be noted that both paths receive their current from the same source and are supplied with the same potential, and, further, that the heating conductor 5ᶜ, before it is cut out of circuit, receives the full line potential, whereas the vapor path within the device will usually receive a less voltage. It is important to notice that the specific device and circuits shown in this figure is very often not only well adapted to economically and efficiently supply initial heating to the container in view of the absence of external energy consuming controlling devices, but that it is also especially well adapted to facilitate the starting operation. Since the voltage impressed upon the conductor 5ᶜ is usually higher than that impressed upon the vapor column, its resistance is comparable with that of the vapor column and relatively higher. This condition has been found in actual practice under certain conditions to facilitate greatly the extension of the current between the electrodes.

In Fig. 6, I have shown a separate source of current connected with the terminals of the rod 5ᶜ, such source being represented at 41, a suitable switch, 42, being connected in its circuit. The connections, however, may be derived from the same source as the main current, as indicated, by the conductors 43 and 44 in Fig. 2, in which case a circuit-breaker 45, may be included in the circuit leading to the apparatus and adapted to act only after such an interval as will afford the proper amount of heating to the apparatus.

Certain features shown and described in the present application are claimed in the following divisional applications, namely: Serial Number 123,874, filed September 18th, 1902, Serial Number 150,170, filed March 30th, 1903, Serial Number 258,149, filed May 1st, 1905, Serial Number 463,147, filed November 18th, 1908, and Serial Number 545,290, filed February 23rd, 1910. Other features are claimed in the following applications which are in part divisions of the present application: Serial Number 203,085, filed April 14th, 1904, and Serial Number 595,948, filed December 6th, 1910.

I claim as my invention:

1. In a gas or vapor electric apparatus of the character described, a positive electrode, a negative electrode having a projection in the form of a solid conductor extending into contact with the positive electrode when the apparatus is not in operation, a conducting gas or vapor between the electrodes, in combination with means for separating the electrodes.

2. In a gas or vapor electric apparatus of the character described, a hermetically sealed container, a positive electrode and a negative electrode within the container, the said negative electrode having a projection in the form of a conductor extending into contact with the positive electrode, a conducting gas or vapor between the electrodes and means operated by the passage of the current through the apparatus for separating the electrodes.

3. In a gas or vapor electric apparatus of the character described, a positive electrode, a negative electrode extending into contact with the positive electrode, an inclosed conducting gas or vapor between the electrodes, means for separating the electrodes by the action of the current passing through the electrodes, a resistance in series with the apparatus when the electrodes are in contact, and means also brought into operation by the action of the current for cutting out resistance when the electrodes are separated.

4. In a gas or vapor electric apparatus of the character described, a hermetically sealed container inclosing a pair of electrodes in contact with each other, a conducting gas or vapor between the electrodes, one of the electrodes being movable, magnetic material connected with the movable electrode, and a solenoid in circuit with the electrode in operative relation to the magnetic material.

5. In a gas or vapor electric apparatus of the character described, a pair of electrodes, a conducting gas or vapor between the electrodes, a solenoid outside the apparatus and an armature in operative relation to the said solenoid, the said armature being inclosed within the container and being sealed hermetically with relation to the other elements within the container.

6. In a gas or vapor electric apparatus of the character described, a pair of electrodes in contact, one of which is movable, a conducting gas or vapor between the electrodes, an armature connected with the movable electrode by a tenacious connection, and a solenoid or magnet outside the apparatus acting upon the armature, said armature being sealed hermetically with respect to the gases or vapors in the container.

7. In a gas or vapor electric apparatus, the combination of a negative electrode, a positive electrode, a conducting gas or vapor between the electrodes, means for forming a solid electrical connection between the two electrodes within the apparatus, and means for severing such connection.

8. In combination, substantially as described, in a gas or vapor apparatus having two electrodes and a gas or vapor path, means for bringing the two electrodes into actual electrical contact inside the apparatus by means of a solid conductor for causing an initial current to traverse the apparatus, means for causing a separation of the electrodes and a consequent passage of current through the gas or vapor, and a vaporizable material adjacent to the remote portion of one of the electrodes.

9. In a gas or vapor apparatus of the character described, the combination of a positive electrode, a negative electrode, a conducting gas or vapor between the electrodes, means for forming a metallic connection between the two electrodes, thereby permitting the passage of electric current, means for interrupting the metallic connection between the electrodes, thereby causing a discontinuance of the flow of current through the metallic connection after the separation of the electrodes.

10. In a gas or vapor electric apparatus, comprising a suitable container, a conducting gas or vapor therein, and two electrodes, means for establishing a circuit through a limited portion of the gas or vapor, and transferring the flow of current through substantially the entire gas or vapor path.

11. In a gas or vapor electric apparatus, a suitable container, a conducting gas or vapor therein, a positive electrode and a negative electrode, and means for starting a flow of current through a portion of the gas or vapor path at the negative electrode.

12. In a gas or vapor apparatus of the character described, a hermetically sealed container, a movable electrode therein, a negative electrode also contained therein, the negative electrode and the movable electrode being in contact, and means for automatically separating the movable electrode from the negative electrode.

13. The combination with a gas or vapor electric apparatus comprising a suitable container, a conducting gas or vapor therein, and a positive and a negative electrode for the conducting gas or vapor, of a continuous conductor through the apparatus independent of the gas or vapor, a switch interposed in the said conductor within the container, and means outside the container for operating the said switch.

14. The combination in a gas or vapor electric apparatus of the character described, of a continuous conductor through the apparatus independent of the conducting gas or vapor therein, and automatic means for interrupting the continuity of the said conductor for starting the apparatus, such means consisting of an electro-magnet located outside the apparatus and an armature inside the apparatus.

15. The combination in a gas or vapor electric apparatus of the character described, of a continuous conductor through the apparatus independent of the conducting gas or vapor, a switch interposed in the said conductor, and automatic means for operating the switch.

16. In an electric lamp, the combination of a light-transmitting envelop, main electrodes one at least of which is of vaporizable material, and means for initiating an electric discharge between said main electrodes comprising separable contact points or members of relatively non-vaporizable material, one of which is electrically connected to one of said main electrodes and the other to the other main electrode.

17. In an electric lamp, the combination of a light-transmitting envelop, main terminals therefor one at least of which is of vaporizable material, means for maintaining a difference of potential between said main terminals, means for initiating a discharge between said main terminals comprising separable contacts adapted when separated to produce an electric discharge, said contacts being of material not readily vaporizable, and an electrical connection between one of said contacts and one of said main terminals.

18. In an electric lamp, the combination of an exhausted light-transmitting envelop, main electrodes therefor one at least of which is of vaporizable material, means for maintaining a difference of potential between said main electrodes, and means for producing an initial electric discharge in said envelop between contact surfaces of material not readily vaporizable thereby causing an electric discharge to take place between said main terminals.

19. In a vapor electric apparatus, means for starting an arc or current flow therein, consisting of a conducting shunt to the arc path, and means for automatically opening and closing the shunt as the arc is formed or broken.

20. The combination with a vapor apparatus provided with a normally closed internal circuit, of automatic means for interrupting the said circuit for starting the apparatus into operation.

21. The combination with a vapor apparatus provided with a normally closed internal circuit, of electro-magnetic means for starting the apparatus into operation.

22. An electric lamp and means for the starting thereof, consisting of a hermetically sealed and completely exhausted container, a plurality of electrodes therein, one at least of which is a vaporizable reconstructing cathode, a conductor extending between said electrodes and having a resistance high relatively to the vapor column and means for establishing and breaking a connection within the container between one of said electrodes and the said conductor.

23. A mercury vapor apparatus comprising an evacuated container for mercury, electrodes therein normally connected inside the container by good conducting material, and means whereby a relative movement of the said container and one of the electrodes will initiate a flow of current through the mercury vapor.

24. A mercury vapor apparatus comprising an evacuated container for mercury, electrodes therein normally connected inside the container by good conducting material, and means permitting a relative movement between one of the electrodes and the container.

25. A mercury vapor apparatus comprising an evacuated container for mercury, electrodes therein normally connected inside the container by good conducting material, and means whereby a relative movement between one of the electrodes and the container will cause a separation of the electrodes.

26. In a mercury vapor apparatus, an evacuated container, electrodes therein, and means whereby the connecting and disconnecting of said electrodes will be effected by a relative movement of one of the electrodes and the container.

27. The combination with a vacuum apparatus comprising a hermetically sealed and completely exhausted container, and suitable electrodes therein including a vaporizable reconstructing cathode, of an internal closed circuit through said cathode, together with automatic means for interrupting said circuit, thus breaking down the negative electrode starting reluctance and initiating normal operation.

28. The combination with a vacuum apparatus comprising a hermetically sealed and completely exhausted container and suitable electrodes therein including a vaporizable reconstructing cathode, of an internal closed circuit through said cathode, together with electromagnetic means for interrupting said circuit, thus breaking down the negative electrode starting reluctance and initiating normal operation.

29. The combination with a vapor apparatus provided with a normally closed internal circuit, of an electromagnet external to the apparatus included in the said circuit and mechanical connections between the magnet armature and the apparatus whereby the said internal circuit is automatically ruptured when the magnet is energized.

30. A vapor device comprising a container, electrodes or contacts in said container and included in the main operating circuit of the device, a conducting liquid or fluid in said container, and automatic means for moving an electrode so as to make and break conductive connection between the said electrodes.

31. A vapor device comprising a container, electrodes, and a conducting liquid in said container included in the main operating-circuit of the device, and automatic means for affecting an electrode so as to make and break conducting connection between the electrodes.

Signed at New York, in the county of New York and State of New York, this twentieth day of March, A. D. 1901.

PETER COOPER HEWITT.

Witnesses:
   STANWOOD E. FLICHTNER,
   WM. H. CAPEL.